US012196353B1

United States Patent
Chenkin

(10) Patent No.: US 12,196,353 B1
(45) Date of Patent: Jan. 14, 2025

(54) DOWNSPOUT ADAPTER

(71) Applicant: Barry Chenkin, Georgetown, DE (US)

(72) Inventor: Barry Chenkin, Georgetown, DE (US)

( * ) Notice: Subject to any disclaimer, the term of this patent is extended or adjusted under 35 U.S.C. 154(b) by 0 days.

(21) Appl. No.: 18/751,731

(22) Filed: Jun. 24, 2024

(51) Int. Cl.
*F16L 37/50* (2006.01)
*E04D 13/08* (2006.01)

(52) U.S. Cl.
CPC ............ *F16L 37/505* (2013.01); *E04D 13/08* (2013.01); *E04D 2013/0813* (2013.01)

(58) Field of Classification Search
CPC . F16L 37/505; E04D 13/08; E04D 2013/0813
See application file for complete search history.

(56) References Cited

U.S. PATENT DOCUMENTS

| | | | | |
|---|---|---|---|---|
| 886,366 | A * | 5/1908 | Hansen | F16L 37/144 403/105 |
| 7,500,506 | B2 * | 3/2009 | Bohlen | E06B 9/36 160/177 V |
| 8,033,058 | B2 | 10/2011 | Block | |
| 8,091,578 | B2 * | 1/2012 | Roth | F16K 1/34 403/326 |
| 8,534,715 | B2 * | 9/2013 | Abbasi | F16L 21/08 285/32 |
| 8,689,837 | B1 * | 4/2014 | Smith | F16L 11/121 285/179 |
| 2007/0046021 | A1 * | 3/2007 | Crawford | E04D 13/08 285/226 |
| 2014/0115998 | A1 | 5/2014 | Horgan | |

FOREIGN PATENT DOCUMENTS

JP 2002167924 A * 6/2002
JP 3396307 B2 * 4/2003

* cited by examiner

*Primary Examiner* — James M Hewitt, II
(74) *Attorney, Agent, or Firm* — Evergreen Valley Law Group; Kanika Radhakrishnan

(57) ABSTRACT

A downspout adapter includes a first part. The first part includes a mouth portion and a hollow structure extending from the mouth portion. The hollow structure includes at least one ratchet member and at least one recessed portion. The downspout adapter includes a second part configured for receiving the hollow structure therein. The second part includes at least one protruding member configured to removably engage with a corresponding recessed portion of the at least one recessed portion while the hollow structure is inserted within the second part. The second part includes at least one engaging member including an engaging end configured to selectively engage with a plurality of teeth of the at least one ratchet member while the hollow structure of the first part is inserted within the second part, thereby detachably coupling the second part with the first part.

19 Claims, 6 Drawing Sheets

DOWNSPOUT ADAPTER

TECHNICAL FIELD

The present invention relates generally to eavestrough systems and more particularly relates to a modular downspout adapter configured with height adjustability features.

BACKGROUND

A downspout adapter is a device used in rainwater management systems to connect different components of a drainage system, specifically linking a downspout to other elements such as drain pipes, splash blocks, or rain barrels. The downspout adapter is essential for ensuring proper water flow and preventing damage to buildings from improper drainage.

Further, existing downspout adapters are designed to provide a straightforward, direct connection between the downspout and the drainage component without altering the alignment. Such downspout adapters are ideal for situations where the downspout and the drainage pipe or accessory are perfectly aligned. However, if the downspout and the drainage pipe or accessory are not perfectly aligned, installation of the existing downspout adapters may be challenging. As a result, the existing downspout adapters possess a risk of leaks or improper water flow. The existing downspout adapters with limited adjustment features are not designed to accommodate misalignment or differences in elevation between the downspout and the drainage component. Such limitations caused by the existing downspout adapters may require additional modifications or fittings to ensure proper connection. Further, in situations where the downspout is not perfectly aligned with the drainage component, there is a risk of water backup or overflow. If the downspout is not connected directly to the drainage system, water may accumulate near the foundation, leading to potential water damage. Moreover, the existing downspout adapters are not suitable for complex rainwater management systems with multiple levels, angles, or obstacles.

Therefore, there is a need for an adjustable downspout adapter to overcome the aforementioned deficiencies along with providing other advantages.

SUMMARY

Various embodiments of the present disclosure disclose an adjustable downspout adapter.

In an embodiment, a downspout adapter is disclosed. The downspout adapter includes a first part. The first part includes a mouth portion and a hollow structure extending from a bottom portion of the mouth portion. The hollow structure includes at least one ratchet member configured on an outer circumferential surface of the hollow structure along at least a length of the hollow structure. The at least one ratchet member includes a plurality of teeth. The hollow structure further includes at least one recessed portion configured on the outer circumferential surface along the length of the hollow structure. Further, the downspout adapter includes a second part configured with a hollow body for receiving the hollow structure of the first part. The second part includes at least one protruding member extending laterally towards a central axis of the second part from at least a portion of a top end of the second part. Each protruding member of the at least one protruding member is configured to removably engage with a corresponding recessed portion of the at least one recessed portion while the hollow structure of the first part is inserted within the second part. The second part further includes at least one engaging member comprising an engaging end. The engaging end of the at least one engaging member is configured to selectively engage with the plurality of teeth of the at least one ratchet member while the hollow structure of the first part is inserted within the second part, thereby detachably coupling the second part with the first part.

In another embodiment, a downspout adapter is disclosed. The downspout adapter includes a first part. The first part includes a mouth portion and a hollow structure extending from a bottom portion of the mouth portion. The hollow structure includes at least one ratchet member configured on an outer circumferential surface of the hollow structure along at least a length of the hollow structure. The at least one ratchet member includes a plurality of teeth. The hollow structure further includes at least one recessed portion configured on the outer circumferential surface along the length of the hollow structure. Further, the downspout adapter includes a second part configured with a hollow body for receiving the hollow structure of the first part. The second part includes at least one protruding member extending laterally towards a central axis of the second part from at least a portion of a top end of the second part. Each protruding member of the at least one protruding member is configured to removably engage with a corresponding recessed portion of the at least one recessed portion while the hollow structure of the first part is inserted within the second part. The at least one recessed portion of the first part removably engaging with the at least one protruding member of the second part prevents the rotation of the first part relative to the second part while the hollow structure of the first part is being inserted into the second part. The second part further includes at least one engaging member comprising an engaging end. The engaging end of the at least one engaging member is configured to selectively engage with the plurality of teeth of the at least one ratchet member while the hollow structure of the first part is inserted within the second part, thereby detachably coupling the second part with the first part. Further, the engaging end of the at least one engaging member selectively engages with the plurality of teeth of the at least one ratchet member due to applying a threshold force for traversing the hollow structure of the first part along the second part.

BRIEF DESCRIPTION OF THE FIGURES

The following detailed description of illustrative embodiments is better understood when read in conjunction with the appended drawings. For the purposes of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers.

Figure 1A:
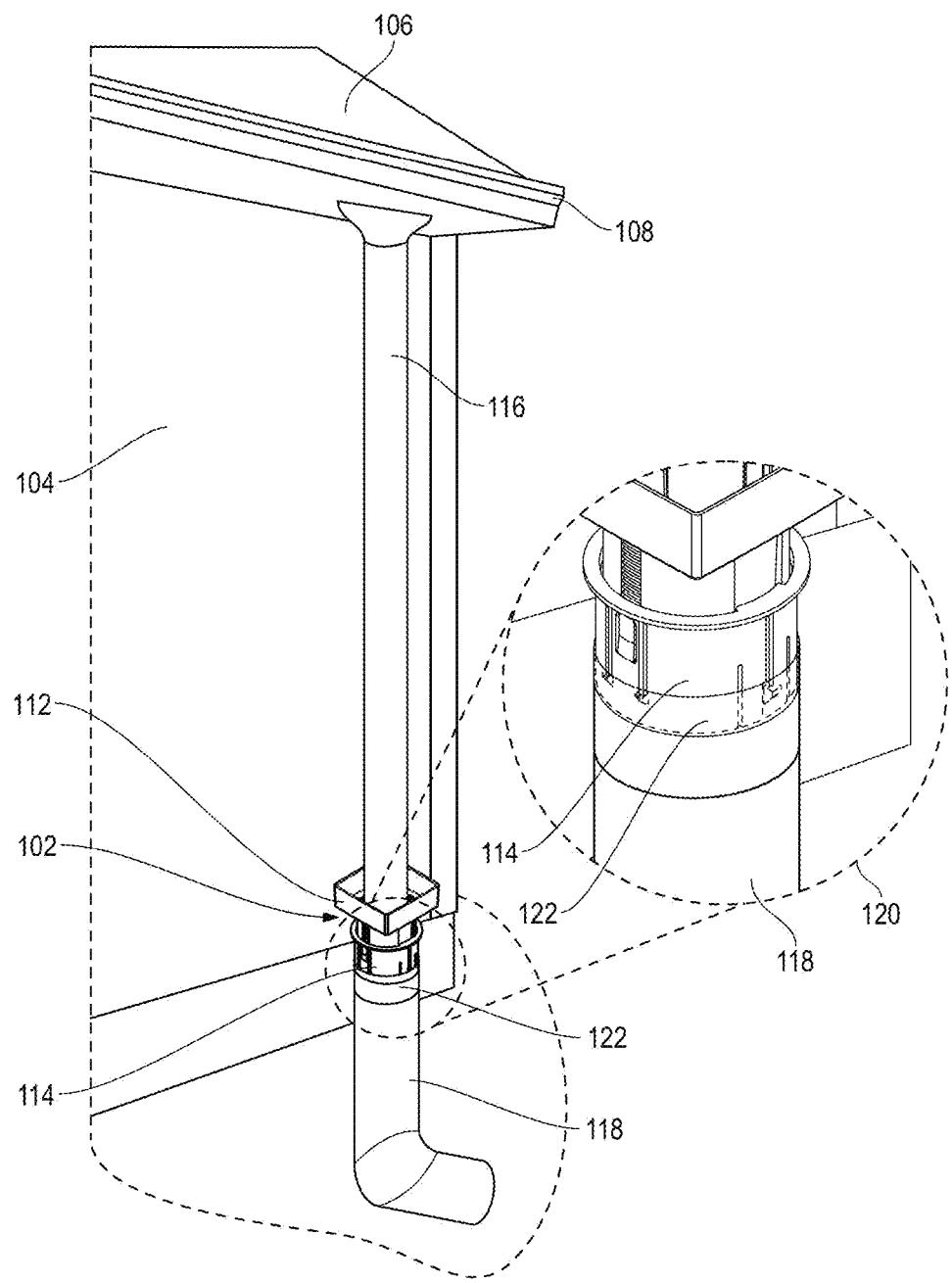
FIGS. 1A and 1B illustrate an example representation of an environment depicting a downspout adapter installed at facility, in accordance with an embodiment of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or conjunction with each other, one skilled in the art will appreciate that many of these features can be provided independently of other features.

Overview

Various embodiments of the present disclosure provide a downspout adapter. A gutter collects, for example, rainwater from a slopped roof of a building. From the gutter, the collected rainwater is discharged outside via a downspout. The downspout adapter has a first part and a second part. The first part includes a mouth portion and a hollow structure extending from the mouth portion. The hollow structure includes at least one ratchet member and at least one recessed portion. The at least one ratchet member is configured on an outer circumferential surface of the hollow structure along at least a length of the hollow structure. The at least one ratchet member includes a plurality of teeth. The at least one recessed portion is configured on the outer circumferential surface along the length of the hollow structure.

The second part is configured with a hollow body for receiving the hollow structure of the first part. The second part includes at least one protruding member extending laterally towards a central axis of the second part from at least a portion of a top end of the second part. Each protruding member of the at least one protruding member is configured to removably engage with a corresponding recessed portion of the at least one recessed portion while the hollow structure of the first part is being inserted within the second part. The second part includes at least one engaging member. The at least one engaging member includes an engaging end. The engaging end of the at least one engaging member is configured to selectively engage with a tooth of the plurality of teeth of the at least one ratchet member while the hollow structure of the first part is being inserted within the second part, thereby detachably coupling the second part with the first part. Depending on a height requirement of the downspout adapter, the engaging end of the at least one engaging member is selectively engaged with the plurality of teeth of the at least one ratchet member, thereby providing the downspout adapter of varying height.

Various embodiments of the present invention are described hereinafter with reference to FIG. 1A to FIG. 7.

FIG. 1A illustrates an example representation of an environment depicting a downspout adapter 102 installed at facility 104, in accordance with an embodiment of the present disclosure. In one example, the facility 104 includes a slopped roof structure 106 for directing liquid (e.g., rainwater) to a channel 108. As shown, the downspout adapter 102 is mounted to a portion of a first conduit 118 and a portion of a second conduit 116. More specifically, the downspout adapter 102 includes a first part 112 and a second part 114. The first part 112 and the second part 114 are detachably coupled to each other to form the downspout adapter 102. Thus, it is apparent that the downspout adapter 102 is a modular structure. Further, the first part 112 of the downspout adapter 102 is coupled to the second conduit 116. The second part 114 is connected to the first conduit 118. In one embodiment, the first conduit 118 is dimensioned in conformity to the dimensions of the second part 114 (see, enlarged view 120 of FIG. 1A) to allow coupling of the first conduit 118 to a smooth inner wall 122 of the second part 114. The first conduit 118 is referred to as a pipe, without limitation, plastic pipe, Polyvinyl Chloride (PVC) pipe, and the like, with a smooth inner circumference or smooth wall. The downspout adapter 102 is selected based on the size and shape of at least the first conduit 118 and the second conduit 116. The downspout adapter 102 is a fitting used in gutter systems to connect a downspout (such as the second conduit 116) to other components such as drainage pipes, downspout extensions, or underground drainage systems (not shown in FIGS.). In other words, the downspout adapter 102 serves as a transition piece that facilitates the proper flow of rainwater from the gutter downspout (i.e., the second conduit 116) to the desired drainage destination (such as a rain barrel, surface drain, or underground drainage system).

In an embodiment, the downspout adapter 102 is installed at a lower level or proximity to the ground level at the facility 104 (as shown in FIG. 1A). In this scenario, the downspout (such as the second conduit 116) is coupled to the channel 108 (e.g., gutter). The downspout adapter 102 is configured to receive the flow of rainwater from the channel 108 through the downspout (i.e., the second conduit 116)

and direct the follow of the rainwater to the desired drainage destination. The downspout adapter 102 may be made of Plastic (e.g., Polyvinyl Chloride (PVC), Polyethylene), aluminum alloy steel material, or any other materials.

Figure 1B:
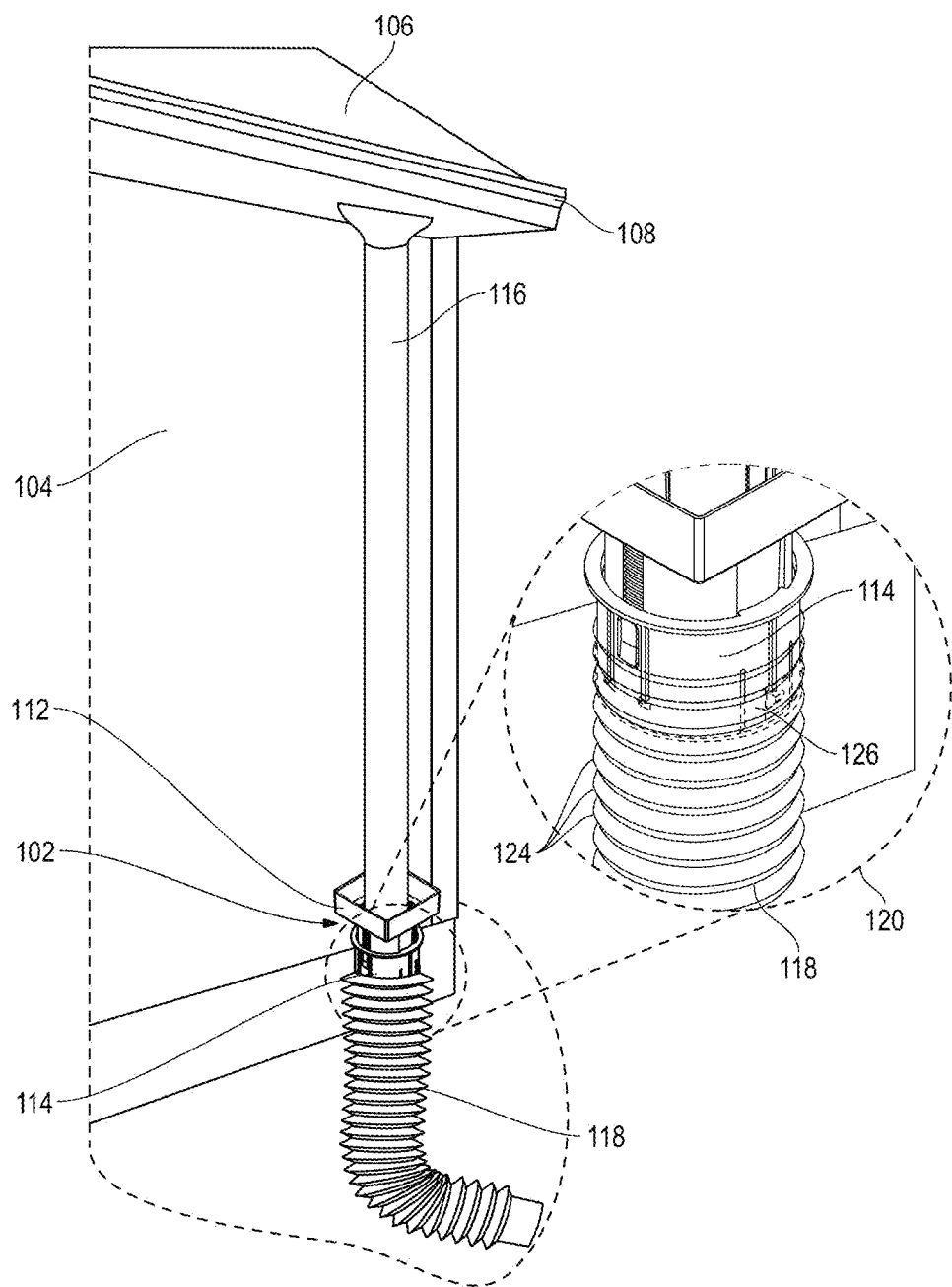

In an embodiment, the first part 112 may be coupled to the second conduit 116 by inserting a trailing end of the second conduit 116 within the first part 112. More specifically, an inner circumference of the first part 112 is configured in conformity with an outer circumference of the second conduit 116. This allows enabling insertion of the second conduit 116 within the hollow structure 214 of the first part 112 for detachably coupling the second conduit 116 with the first part 112. In an embodiment, the first conduit 118 and the second conduit 116 may be configured with equal dimensions. Referring to FIG. 1B, the first conduit 118 is a corrugated pipe. The corrugated pipe has a plurality of ribs 124 protruding outwardly from an inner circumference of the first conduit 118. The second part 114 has one or more engagement members (see, 230, 234 of FIG. 2). The one or more engagement members of the first part 112 are configured to conformity with a rib 126 of the plurality of ribs 124 of the first conduit 118. The required height of the downspout adapter 102 is achieved by engaging the one or more engagement members with a suitable rib (e.g., rib 126) of the plurality of ribs 124. The structural configuration and functionality of the downspout adapter 102 are further explained in detail.

Figure 2:
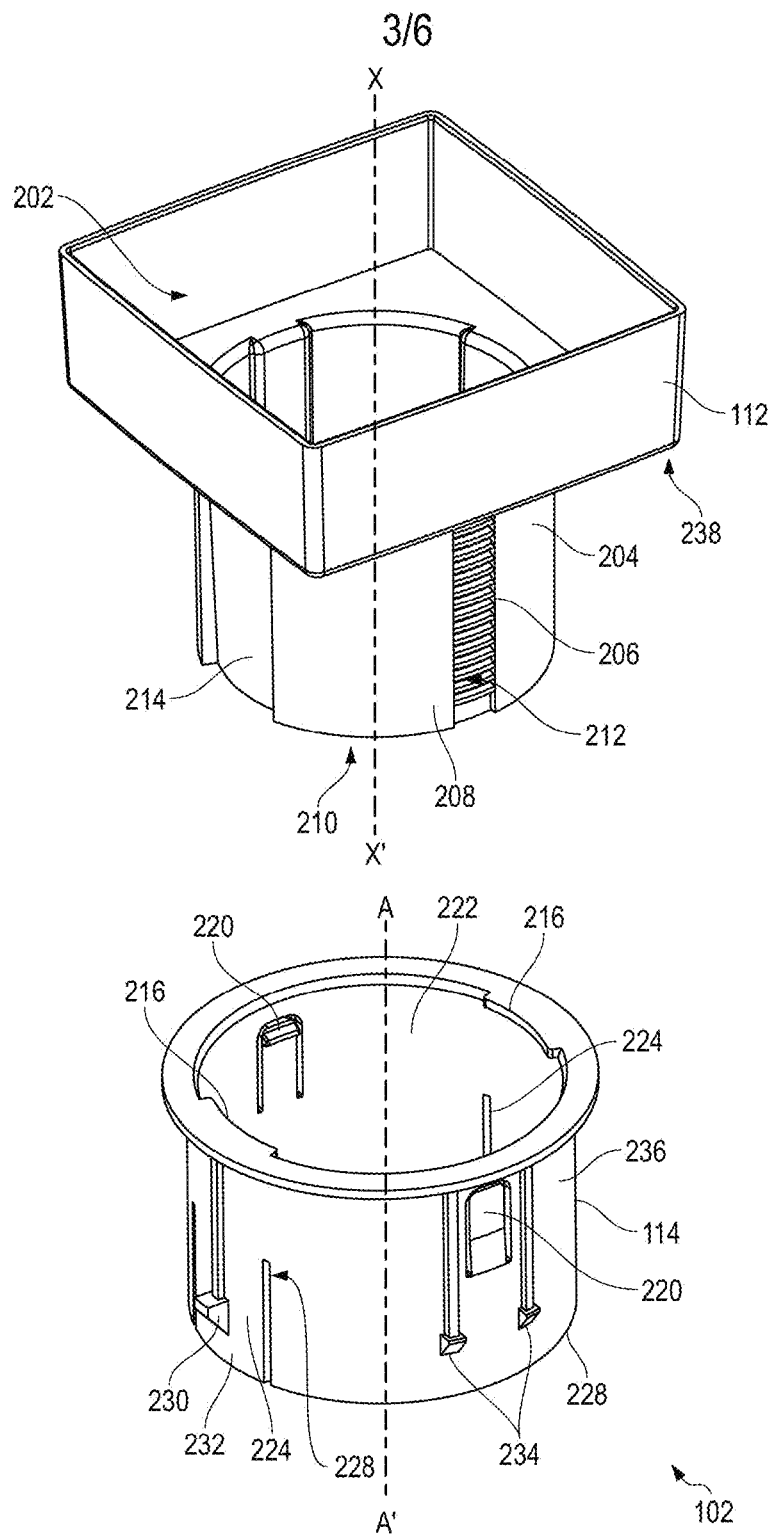
FIG. 2 illustrates an exploded view of the downspout adapter, in accordance with an embodiment of the present disclosure.

FIG. 2 illustrates an exploded view of the downspout adapter 102, in accordance with an embodiment of the present disclosure. As explained above, the downspout adapter 102 includes the first part 112 and the second part 114. The first part 112 includes a mouth portion 202 and a hollow structure 204. The hollow structure 204 extends from the mouth portion 202. In particular, the hollow structure 204 extends from the mouth portion 202 along a longitudinal axis X-X' of the first part 112. In other words, the hollow structure 204 extends perpendicularly from the mouth portion 202. In one embodiment, the mouth portion 202 and the hollow structure 204 may be integral components of the first part 112. The hollow structure 204 and the mouth portion 202 may be integrally formed using conventional manufacturing processes such as casting, molding, and the like. In another embodiment, the mouth portion 202 and the hollow structure 204 may be modular. In this scenario, the mouth portion 202 and the hollow structure 204 may be coupled to each other to form the first part 202 without compromising the structural integrity of the first part 112.

In one example, the hollow structure 204 extending from a bottom portion 238 of the mouth portion 202 is located centrally in the first part 112. In this example, the mouth portion 202 is symmetrical with respect to the longitudinal axis X-X' (as shown in FIG. 2). The mouth portion 202 of the first part 112 is configured with a cuboidal shape. Alternatively, the mouth portion 202 of the first part 112 may be configured with any other shape as per the design feasibility and requirements.

In another example, the mouth portion 202 may be offset from the hollow structure 204 based on design feasibility and requirements. In other words, the mouth portion 202 may be configured with angled or offset designs to redirect water flow from the second conduit 116 and to accommodate obstacles such as walls or landscaping features. As shown in FIG. 1A, the mouth portion 202 may be coupled to the second conduit 116 by inserting the trailing end of the second conduit 116 (i.e., downspout) within the inner circumference of the hollow structure 204 of the first part 112. Thus, the rainwater collected in the channel 108 is received in the second conduit 116, and from the second conduit 116, the rainwater is received by the downspout adapter 102 through the mouth portion 202. As shown in FIG. 1A, the mouth portion 202 may be coupled to the downspout (i.e., the second conduit 116). In an embodiment, the mouth portion 202 of the downspout adapter 102 may be arranged below the trailing end of the second conduit 116 for receiving the rainwater.

Figure 3:
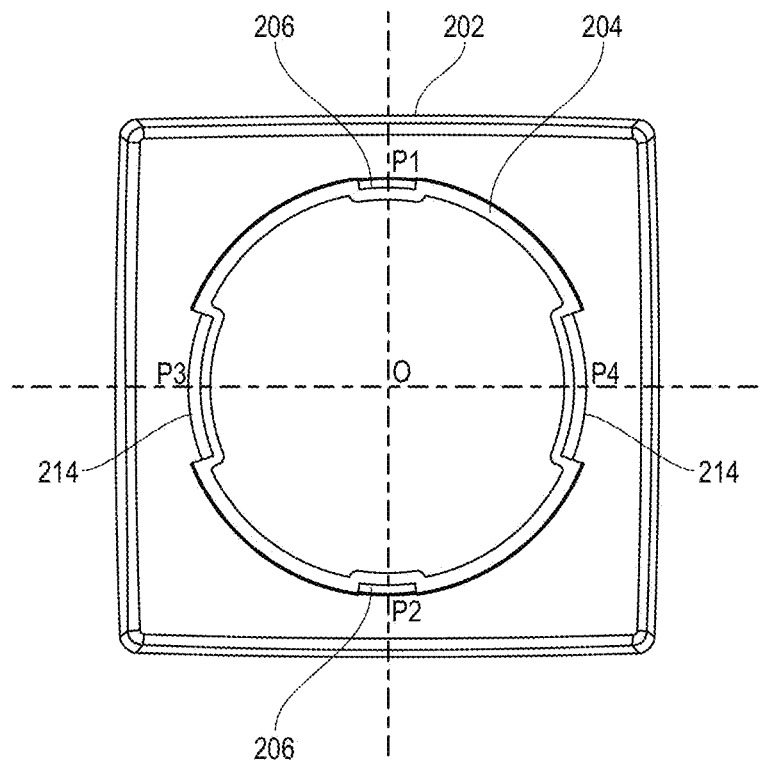
FIG. 3 illustrates a bottom view of a first part of the downspout adapter of FIG. 2, in accordance with an embodiment of the present disclosure.
Figure 4:
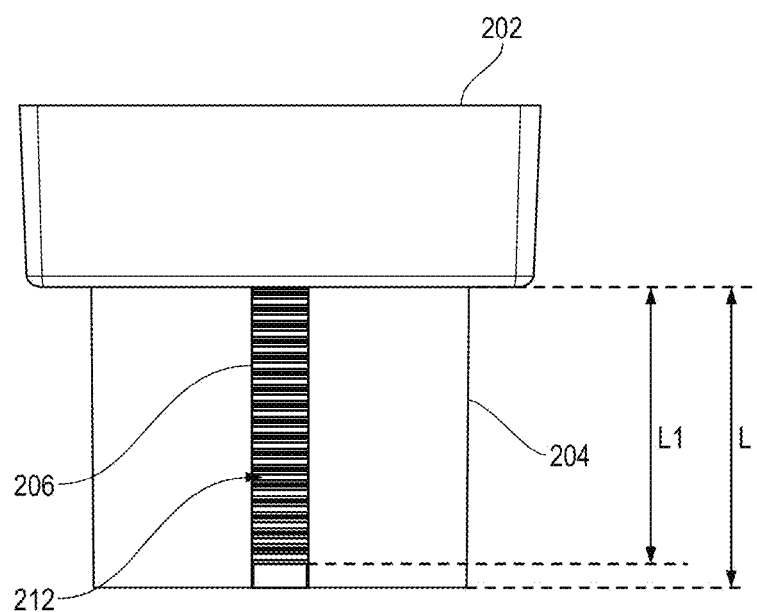
FIG. 4 illustrates a side elevation view of the first part of the downspout adapter of FIG. 2, in accordance with an embodiment of the present disclosure.

Referring to FIG. 3 in conjunction with FIG. 2, the hollow structure 204 of the first part 112 includes at least one ratchet member 206. Further, each ratchet member 206 (e.g., two ratchet members) is configured on diametrically opposite sides (exemplarily represented as 'P1' and 'P2') of the hollow structure 204. In an embodiment, the ratchet members 206 may be configured on any other locations of the hollow structure 204 as per the design feasibility and requirement. Further, the ratchet members 206 are configured on an outer circumferential surface 208 of the hollow structure 204 along at least a length (L) of the hollow structure 204 (as shown in FIG. 4). In particular, a predefined length (L1) of the outer circumferential surface 208 of the hollow structure 204 is configured with the ratchet members 206 (as shown in FIG. 4). The ratchet members 206 are at an offset from a bottom portion 210 of the first part 112 (as shown in FIG. 2 and FIG. 4). Further, the ratchet members 206 include a plurality of teeth 212.

The hollow structure 204 further includes at least one recessed portion 214 configured on the outer circumferential surface 208 along the length (L) of the hollow structure 204. Further, each recessed portion 214 (e.g., two recessed portions) is configured on diametrically opposite sides (exemplarily represented as 'P3' and 'P4') of the hollow structure 204 (as shown in FIG. 3). In an embodiment, the recessed portions 214 may be configured on any other locations of the hollow structure 204 as per the design feasibility and requirement. It is apparent that each recessed portion 214 is configured at 45 degrees from each ratchet member 206. In other words, an offset of the ratchet members 206 and an offset of the recessed portions 214 from a center point (exemplarily represented as 'O') of the hollow structure 204 are equal.

Figure 5:
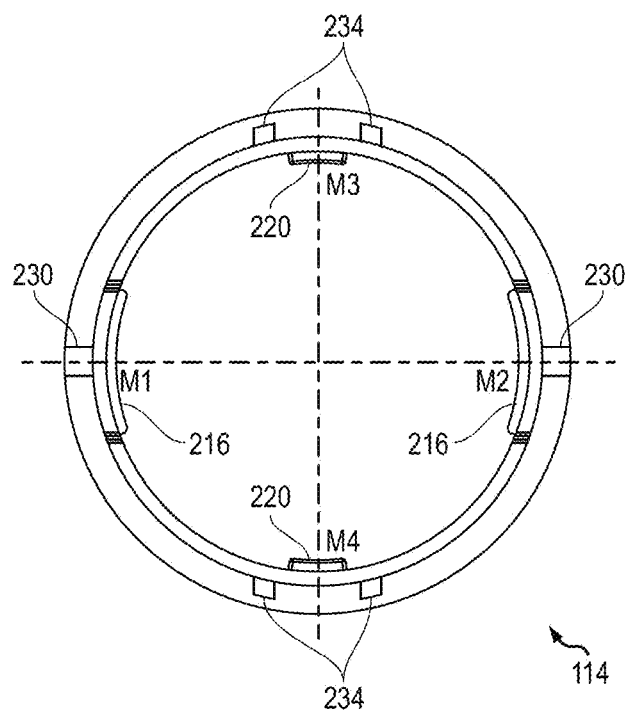
FIG. 5 illustrates a bottom view of a second part of the downspout adapter of FIG. 2, in accordance with an embodiment of the present disclosure.

Referring to FIG. 2, the second part 114 is configured with a hollow body for receiving the hollow structure 204 of the first part 112 which will be explained further in detail. The second part 114 includes at least one protruding member 216. The protruding members 216 extends laterally towards a central axis A-A' of the second part 114 from at least a portion of a top end 218 of the second part 114. As shown, the protruding members 216 are configured at diametrically opposite sides (exemplarily represented as 'M1' and 'M2') of the second part 114 (as shown in FIG. 5). Further, the second part 114 includes at least one engaging member 220. Further, each engaging member 220 is configured on diametrically opposite sides (exemplarily represented as 'M3' and 'M4') of the second part 114 (as shown in FIG. 5).

Figure 6:
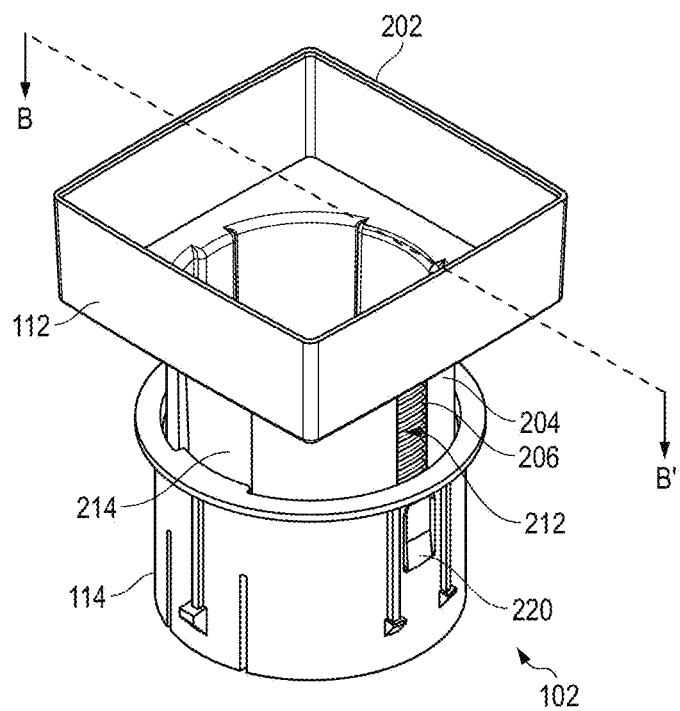
FIG. 6 illustrates a perspective view of the downspout adapter depicting the first part and the second part detachably coupled to each other, in accordance with an embodiment of the present disclosure.

FIG. 6 illustrates a perspective view of the first part 112 and the second part 114 detachably coupled to each other to form the downspout adapter 102, in accordance with an embodiment of the present disclosure. In particular, the outer circumferential surface 208 of the hollow structure 204 of the first part 112 is configured in conformity with an inner circumferential surface (see, 222 of FIG. 2) of the hollow body of the second part 114. This allows the insertion of the hollow structure 204 of the first part 112 within the second part 114 for detachably coupling the first part 112 to the second part 114. It is to be noted that the recessed portions 214 and the ratchet members 206 of the first part 112 are oriented/positioned in line with the protruding members 216 and the engaging members 220 of the second part 114, respectively, for coupling the first part 112 and the second part 114. In other words, the first part 112 is slidably inserted into the second part 114 upon positioning the recessed portions 214 and the ratchet members 206 parallel to the protruding members 216 and the engaging members 220. Further, inserting the hollow structure 204 of the first part 112 within the second part 114 enables each protruding member 216 to removably engage with a corresponding recessed portion 214. In other words, the protruding members 216 of the second part 114 abuts the recessed portions 214 of the first part 112 while the hollow structure 204 of the first part 112 is inserted within the second part 114. It is to be noted that the protruding members 216 and the recessed portions 214 are configured with complementary structures for enabling engagement of the protruding members 216 with the recessed portions 214 while the hollow structure 204 of the first part 112 is inserted within the second part 114. The recessed portions 214 removably engaging with the protruding members 216 prevents the rotation of the first part 112 relative to the second part 114 while the hollow structure 204 of the first part 112 is inserted into the second part 114.

Figure 7:
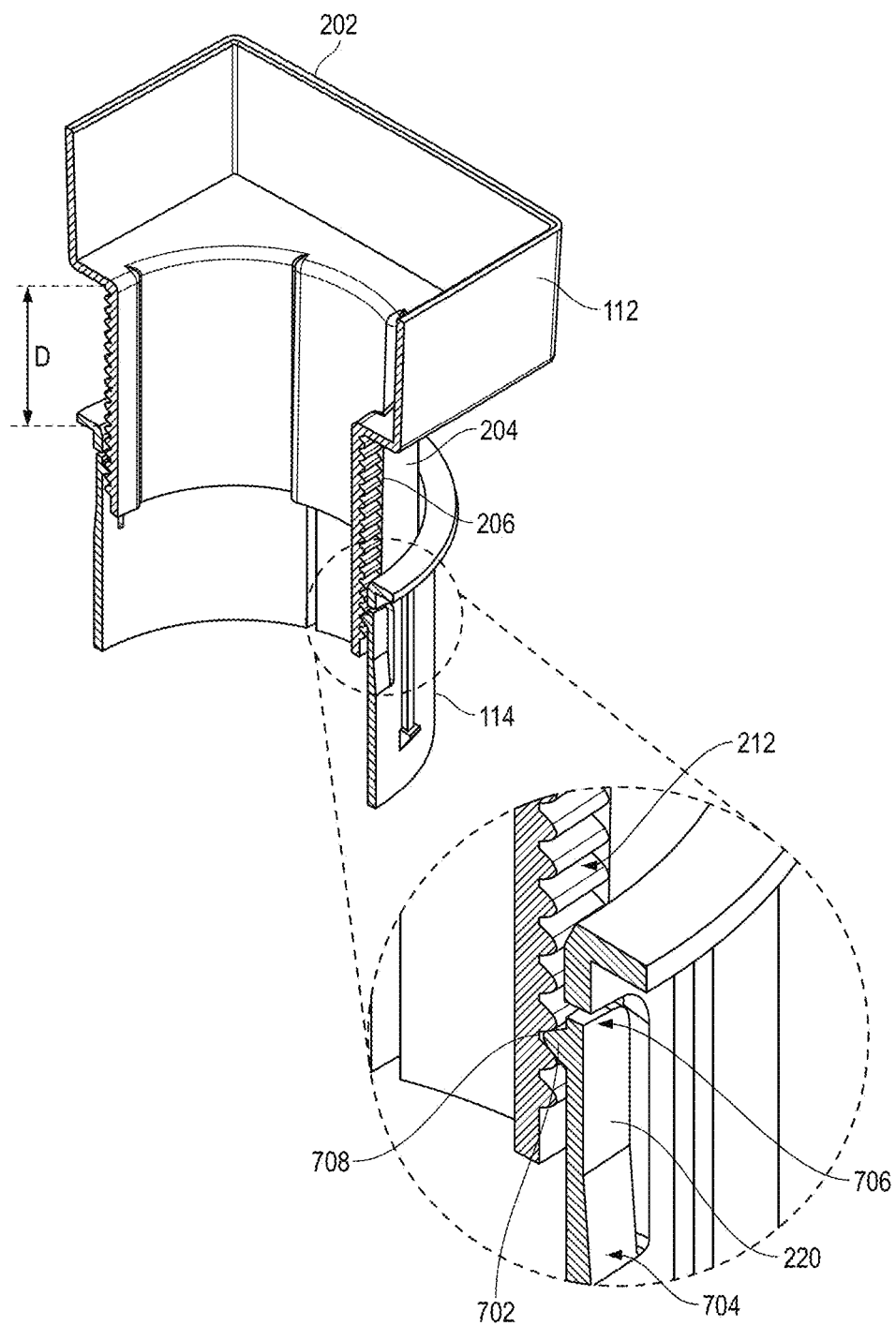
FIG. 7 illustrates a cross-sectional view of the downspout adapter along an axis B-B' of the downspout adapter as shown in FIG. 6, in accordance with an embodiment of the present disclosure.

FIG. 7 illustrates a cross-sectional view of the downspout adapter 102 along an axis B-B' of the downspout adapter as shown in FIG. 6, in accordance with an embodiment of the present disclosure. The engaging members 220 includes an engaging end (see, 702 of FIG. 7). Specifically, each of the engaging members 220 of the second part 114 includes a bottom portion (see, 704 of FIG. 7) and a top portion (see, 706 of FIG. 7) disposed freely in the second part 114. The top portion 706 of each engaging member 220 includes the engaging end 702. The engaging end 702 is oriented inwardly or towards the central axis A-A' of the second part 114 (as shown in FIGS. 2 and 7). The engaging end 702 of each engaging member 220 is configured to selectively engage with a tooth (for example, a tooth 708 of FIG. 7) of the plurality of teeth 212 of each ratchet member 206 while the hollow structure 204 of the first part 112 is inserted within the second part 114.

In particular, the engaging end 702 of the engaging members 220 selectively engages with the plurality of teeth 212 of the ratchet members 206 based on applying a threshold force for traversing the hollow structure 204 of the first part 112 along the second part 114. The threshold force is applied on the first part 112 against the second part 114 upon inserting the bottom portion 210 of the hollow structure 204 of the first part 112 within the second part 114 from the side of the top end 218 of the second part 114. The threshold force refers to the driving force for traversing the hollow structure 204 of the first part 112 along the second part 114. In other words, the threshold force is applied for operating the hollow structure 204 of the first part 112 in an upward direction and a downward direction within the second part 114 for selecting engaging the engaging end 702 with the teeth 212. Further, the threshold force is defined based on a tooth pitch of the plurality of teeth 212. The tooth pitch determines the spacing of teeth 212 and for ensuring proper engagement and smooth operation for selectively engaging the engaging end 702 of the engaging members 220 with the teeth 212. The teeth 212 of the ratchet members 206 are configured to be symmetrical (as shown in FIG. 7).

It is to be noted that the engaging members 220 are configured to pivot within the second part 114 (or the hollow body) while the first part 112 traverses along the second part 114 based on applying the threshold force. This enables the engaging end 702 of the engaging members 220 to selectively engage with the plurality of teeth 212. The pivotal movement of the engaging members 220 is caused due to the bottom portion 704 of the engaging members 220 integrated within the second part 114 and the top portion 706 of the engaging members 220 disposed freely in the second part 114. The engaging members 220 selectively engaging with the plurality of teeth 212 of the ratchet members 206 results in adjusting a distance (exemplarily depicted to be 'D' in FIG. 7) between the first part 112 and the second part 114. This configuration of the downspout adapter 102 may be referred to as an offset adapter. Depending on the height requirement of the downspout adapter 102, the hollow structure 204 may be pulled out from the second part 114 or pushed inside the second part 114 to adjust the height of the first part 112 relative to the second part 114. The detachable coupling of the engaging members 220 with the teeth 212 of the ratchet members 206 corresponds to snap-fit coupling. In other words, the downspout adapter 102 snaps onto the first conduit 118.

Referring to FIG. 2, the second part 114 further includes a set of flap members 224. The set of flap members 224 is configured on at least a portion of the second part 114 along the central axis A-A' of the second part 114. As shown, the set of flap members 224 extends from a central portion 228 of the second part 114. The set of flap members 224 is configured to pivot by a threshold distance to allow insertion of a conduit (such as the first conduit 118) via a bottom end 228 of the second part 114. For example, two flap members (such as the flap members 224) are configured on either side of the second part 114 (as shown in FIG. 5). Further, each flap member 224 is positioned parallel to each recessed portion 214 when the first part 112 is detachably coupled to the second part 114.

Further, the second part 114 includes at least one first engagement member 230 configured on an exterior surface 232 of each flap member 224 and positioned proximate to the bottom end 228 of the second part 114. The second part 114 further includes at least one second engagement member 234. The second engagement members 234 are configured on an outer surface 236 of the second part 114 positioned proximate to the at least one engaging member 220 of the second part 114 (as shown in FIG. 2). Further, the second engagement members 234 are positioned proximate to the bottom end 228 of the second part 114 (as shown in FIG. 2). As shown, two second engagement members such as the second engagement members 234 are configured proximate to each engaging member 220 (as shown in FIGS. 2 and 5).

The first engagement members 230 and the second engagement members 234 are configured to removably engage with a conduit (e.g., the first conduit 118). As shown, the first conduit 118 is a plastic/PVC pipe of the smooth inner wall. Hence, the flat configuration of the first conduit 118 allows the first engagement members 230 and the second engagement members 234 to be forced towards the center of the hollow body of the second part 114 to allow coupling of the first conduit 118 and the second part 114. Upon insertion, the first engagement members 230, and the second engagement members 234 are forced away from the center of the hollow body of the second part 114, thereby firmly engaging with the first conduit 118. This enables the first conduit 118 to be detachably coupled to the second part 114. Alternatively, other types of conduit and engagement members may be used, as per the design feasibility and requirements, for coupling to the downspout adapter 102. The first engagement members 230 and the second engagement members 234 are configured with a wedge profile (as shown in FIG. 2). In an embodiment, the wedge profile of the first engagement members 230 is dimensioned less than the wedge profile of the second engagement members 234 (as shown in FIGS. 2 and 5). This configuration of the first engagement members 230 enables the first conduit 118 to contact the first engagement members 230 while the first conduit 118 is inserted via the bottom end 228 of the second part 114.

Further, the first engagement members 230 are configured to removably engage with first conduit 118 due to a pivotal movement caused by the flap members 224 of the second part 114. The pivotal movement of the flap members 224 is caused while the first conduit 118 is slidably inserted to the second part 114 via the bottom end 228 of the second part 114. Further, the threshold distance refers to the distance that the flap members 224 travels towards the central axis A-A' while the first conduit 118 being inserted via the bottom end 228 of the second part 114 forces against the first engagement members 230 and retracts to an original state aligning parallel to the central axis A-A'. This enables the first engagement members 230 and the second engagement members 234 to removably engage with the first conduit 118. More specifically, in one embodiment, the first engagement members 230 and the second engagement members 234 of the second part 114 are removably engaged with the smooth inner wall 122 (see, FIG. 1A) of the first conduit 118 (i.e., smooth pipe). In another embodiment, the first engagement members 230 and the second engagement members 234 of the second part 114 are removably engaged with the rid 126 (see, FIG. 1B) of the first conduit 118 (i.e., corrugated pipe). The downspout adapter 102 may be configured in various sizes and shapes to match the downspout (i.e., the second conduit 116) dimensions (rectangular, round, or square) and the drainage system components (i.e., the first conduit 118). This allows seamless connection and water flow.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A downspout adapter, comprising:
    a first part comprising a mouth portion and a hollow structure extending from the mouth portion, the hollow structure comprising:
        at least one ratchet member configured on an outer circumferential surface of the hollow structure along at least a length of the hollow structure, the at least one ratchet member comprising a plurality of teeth, and
        at least one recessed portion configured on the outer circumferential surface along the length of the hollow structure; and
    a second part configured with a hollow body for receiving the hollow structure of the first part, the second part comprising:
        at least one protruding member extending laterally towards a central axis of the second part from at least a portion of a top end of the second part, wherein each protruding member of the at least one protruding member is configured to removably engage with a corresponding recessed portion of the at least one recessed portion while the hollow structure of the first part is inserted within the second part,
        at least one engaging member comprising an engaging end, wherein the engaging end of the at least one engaging member is configured to selectively engage with the plurality of teeth of the at least one ratchet member while the hollow structure of the first part is inserted within the second part, thereby detachably coupling the second part with the first part,
        a set of flap members configured on at least a portion between a bottom end of the second part along the central axis of the second part, the set of flap members configured to pivot by a threshold distance for allowing insertion of a first conduit via the bottom end of the second part, and
        at least one first engagement member configured on an exterior surface of each flap member of the set of flap members and positioned proximate to the bottom end of the second part, the at least one first engagement member to be forced towards the center of the hollow body of the second part to allow coupling of the first conduit and the second part.

2. The downspout adapter as claimed in claim 1, wherein the at least one recessed portion of the first part removably engaging with the at least one protruding member of the second part prevents the rotation of the first part relative to the second part while the hollow structure of the first part is being inserted into the second part.

3. The downspout adapter as claimed in claim 1, wherein the engaging end of the at least one engaging member selectively engages with the plurality of teeth of the at least one ratchet member due to applying a threshold force for traversing the hollow structure of the first part along the second part upon inserting a bottom portion of the hollow structure of the first part within the second part from the side of the top end of the second part.

4. The downspout adapter as claimed in claim 3, wherein the at least one engaging member is configured to pivot within the second part while the first part traverses along the second part based on applying the threshold force, thereby enabling the engaging end of the at least one engaging member to selectively engage with the plurality of teeth.

5. The downspout adapter as claimed in claim 3, wherein the at least one engaging member selectively engaging with the plurality of teeth of the at least one ratchet member results in adjusting a distance between the first part and the second part.

6. The downspout adapter as claimed in claim 1, wherein the second part further comprises:
    at least one second engagement member configured on an outer surface of the second part proximate to the at least one engaging member of the second part, the at least one second engagement member positioned proximate to the bottom end of the second part.

7. The downspout adapter as claimed in claim 6, wherein the at least one first engagement member and the at least one second engagement member are configured to removably engage with a first conduit, for detachably coupling the first conduit to the second part.

8. The downspout adapter as claimed in claim 7, wherein the at least one first engagement member is configured to removably engage with the first conduit due to a pivotal movement caused by a set of flap members of the second part while the first conduit is slidably inserted to the second part via the bottom end of the second part.

9. The downspout adapter as claimed in claim 7, wherein the at least one first engagement member and the at least one second engagement member are configured with a wedge profile.

10. The downspout adapter as claimed in claim 1, wherein the outer circumferential surface of the hollow structure of the first part is configured in conformity with an inner circumferential surface of the hollow body of the second part, thereby allowing insertion of the hollow structure of the first part within the second part for detachably coupling the first part to the second part.

11. The downspout adapter as claimed in claim 1, wherein an inner circumference of the hollow structure of the first part is configured in conformity with an outer circumference of the second conduit, thereby enabling insertion of the second conduit within the hollow structure of the first part for detachably coupling the second conduit with the first part.

12. The downspout adapter as claimed in claim 1, wherein each tooth of the plurality of teeth is configured symmetrically.

13. The downspout adapter as claimed in claim 1, wherein the mouth portion of the first part is configured with a cuboidal shape.

14. A downspout adapter, comprising:
  a first part comprising a mouth portion and a hollow structure extending from the mouth portion, the hollow structure comprising:
    at least one ratchet member configured on an outer circumferential surface of the hollow structure along at least a length of the hollow structure, the at least one ratchet member comprising a plurality of teeth, and
    at least one recessed portion configured on the outer circumferential surface along the length of the hollow structure; and
  a second part configured with a hollow body for receiving the hollow structure of the first part, the second part comprising:
    at least one protruding member extending laterally towards a central axis of the second part from at least a portion of a top end of the second part, wherein each protruding member of the at least one protruding member is configured to removably engage with a corresponding recessed portion of the at least one recessed portion while the hollow structure of the first part is inserted within the second part,
    wherein the at least one recessed portion of the first part removably engaging with the at least one protruding member of the second part prevents the rotation of the first part relative to the second part while the hollow structure of the first part is being inserted into the second part,
    at least one engaging member comprising an engaging end, wherein the engaging end of the at least one engaging member is configured to selectively engage with the plurality of teeth of the at least one ratchet member while the hollow structure of the first part is inserted within the second part, thereby detachably coupling the second part with the first part,
    wherein the engaging end of the at least one engaging member selectively engages with the plurality of teeth of the at least one ratchet member due to applying a threshold force for traversing the hollow structure of the first part along the second part,
    a set of flap members configured on at least a portion between a bottom end of the second part along the central axis of the second part, the set of flap members configured to pivot by a threshold distance for allowing insertion of a first conduit via the bottom end of the second part, and
    at least one first engagement member configured on an exterior surface of each flap member of the set of flap members and positioned proximate to the bottom end of the second part, the at least one first engagement member to be forced towards the center of the hollow body of the second part to allow coupling of the first conduit and the second part.

15. The downspout adapter as claimed in claim 14, wherein the at least one engaging member is configured to pivot within the second part while the first part traverses along the second part based on applying the threshold force, thereby enabling the engaging end of the at least one engaging member to selectively engage with the plurality of teeth, and
  wherein the at least one engaging member selectively engaging with the plurality of teeth of the at least one ratchet member results in adjusting a distance between the first part and the second part.

16. The downspout adapter as claimed in claim 14, wherein the second part further comprises:
  at least one second engagement member configured on an outer surface of the second part proximate to the at least one engaging member of the second part, the at least one second engagement member positioned proximate to the bottom end of the second part.

17. The downspout adapter as claimed in claim 16, wherein the at least one first engagement member and the at least one second engagement member are configured to removably engage with the first conduit, for detachably coupling the first conduit to the second part, and
  wherein the at least one first engagement member is configured to removably engage with the first conduit due to a pivotal movement caused by the set of flap members of the second part while the first conduit is slidably inserted to the second part via the bottom end of the second part.

18. The downspout adapter as claimed in claim 14, wherein an inner circumference of the hollow structure of the first part is configured in conformity with an outer circumference of the second conduit, thereby enabling insertion of the second conduit within the hollow structure of the first part for detachably coupling the second conduit with the first part.

19. The downspout adapter as claimed in claim 14, wherein each tooth of the plurality of teeth is configured symmetrically.

* * * * *